(12) United States Patent
Reeve et al.

(10) Patent No.: US 12,242,795 B2
(45) Date of Patent: Mar. 4, 2025

(54) GENERATING TARGET SCHEMA BASED ON SOURCE SCHEMA AND QUERY EXPRESSION

(71) Applicant: International Business Machines Corporation, Armonk, NY (US)

(72) Inventors: John Anthony Reeve, Winchester (GB); Trevor Clifford Dolby, Minneapolis, MN (US); Andrew John Coleman, Petersfield (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/191,659

(22) Filed: Mar. 28, 2023

(65) Prior Publication Data

US 2024/0330571 A1  Oct. 3, 2024

(51) Int. Cl.
*G06F 40/154*  (2020.01)
*G06F 16/84*  (2019.01)

(52) U.S. Cl.
CPC ............ *G06F 40/154* (2020.01); *G06F 16/84* (2019.01)

(58) Field of Classification Search
CPC ................................ G06F 40/154; G06F 16/84
See application file for complete search history.

(56) References Cited

U.S. PATENT DOCUMENTS

| | | | |
|---|---|---|---|
| 9,626,368 B2 | 4/2017 | Nicola et al. | |
| 10,102,269 B2 | 10/2018 | Marin | |
| 10,127,250 B2 | 11/2018 | Dingman et al. | |
| 10,747,588 B2 * | 8/2020 | Bussler | G06F 9/541 |
| 10,860,548 B2 | 12/2020 | Roth et al. | |
| 11,099,823 B2 * | 8/2021 | Gass | G06F 8/65 |
| 11,341,154 B2 * | 5/2022 | Mitra | G06F 40/211 |
| 2003/0182282 A1 * | 9/2003 | Ripley | G06F 16/2468 |
| | | | 707/999.005 |
| 2006/0235882 A1 * | 10/2006 | Mateescu | H04L 65/1101 |
| 2007/0203931 A1 * | 8/2007 | Ukelson | G06F 16/88 |
| 2009/0006943 A1 * | 1/2009 | Matheson | G06F 40/226 |
| | | | 715/234 |
| 2014/0324857 A1 * | 10/2014 | Hazelwood | G06F 16/907 |
| | | | 707/736 |
| 2018/0121259 A1 * | 5/2018 | Bussler | G06F 9/541 |
| 2020/0356570 A1 * | 11/2020 | Carr | G06F 16/168 |
| 2020/0409970 A1 * | 12/2020 | Dhayanithi | G06F 16/258 |
| 2021/0192397 A1 * | 6/2021 | Rastogi | G06N 20/00 |

(Continued)

OTHER PUBLICATIONS

Stack Overflow, "transforming with xsl an xml schema template to an other xml schema template," Stack Exchange Inc., last edited edited Jun. 14, 2011, accessed Mar. 27, 2023, 4 pages. https://stackoverflow.com/questions/6341829/transforming-with-xsl-an-xml-schema-template-to-an-other-xml-schema-template.

(Continued)

*Primary Examiner* — Tadesse Hailu
(74) *Attorney, Agent, or Firm* — Yee & Associates, P.C.

(57) ABSTRACT

Generating a target schema is provided. The method comprises receiving an input schema that defines an input structure and receiving a transformation map. The transformation map and the input schema are both parsed, and a first tree for the map and a second tree for the schema are traversed in a step fashion. According to the traversal of the first tree and second tree, a target schema is generated that is valid for all possible instance documents that the transformation map would generate.

20 Claims, 5 Drawing Sheets

(56) References Cited

U.S. PATENT DOCUMENTS

| | | | |
|---|---|---|---|
| 2021/0224295 A1* | 7/2021 | Coleman | G06F 16/282 |
| 2023/0008057 A1* | 1/2023 | Hendry | G06Q 40/08 |
| 2024/0303241 A1* | 9/2024 | Gupta | G06F 16/24564 |

OTHER PUBLICATIONS

Stack Overflow, "XSLT to transform XSD to another XSD with minOccurs tags," Stack Exchange Inc., last edited edited May 23, 2017, accessed Mar. 27, 2023, 2 pages. https://stackoverflow.com/questions/19361277/xslt-to-transform-xsd-to-another-xsd-with-minoccurs-tags.

Wikipedia, "XML Schema (W3C)," Wikimedia Foundation, Inc., last edited Aug. 17, 2022, accessed Mar. 27, 2023, 7 pages. https://en.wikipedia.org/wiki/XML_Schema_(W3C).

Wikipedia, "XSLT," Wikimedia Foundation, Inc., last edited Feb. 10, 2023, accessed on Mar. 27, 2023, 10 pages. https://en.wikipedia.org/wiki/XSLT.

\* cited by examiner

GENERATING TARGET SCHEMA BASED ON SOURCE SCHEMA AND QUERY EXPRESSION

BACKGROUND

The present disclosure relates generally to an improved computing system, and more specifically to generating a target schema based on an input schema.

Message mapping is commonly used in system integration products. At a minimum, message mapping requires a source schema and a set of mappings to produce an output message when presented with an input message. This output message may optionally be represented by a target schema, but this is not required as mapping technologies do not mandate target schemas when transforming messages.

SUMMARY

An illustrative embodiment provides a computer-implemented method for generating a target schema. The method comprises receiving an input schema that defines an input structure and receiving a transformation map. The transformation map and the input schema are both parsed, and a first tree for the map and a second tree for the schema are traversed in a step fashion. According to the traversal of the first tree and second tree, a target schema is generated that is valid for all possible instance documents that the transformation map would generate. According to other illustrative embodiments, a computer system, and a computer program product for generating a target schema are provided.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
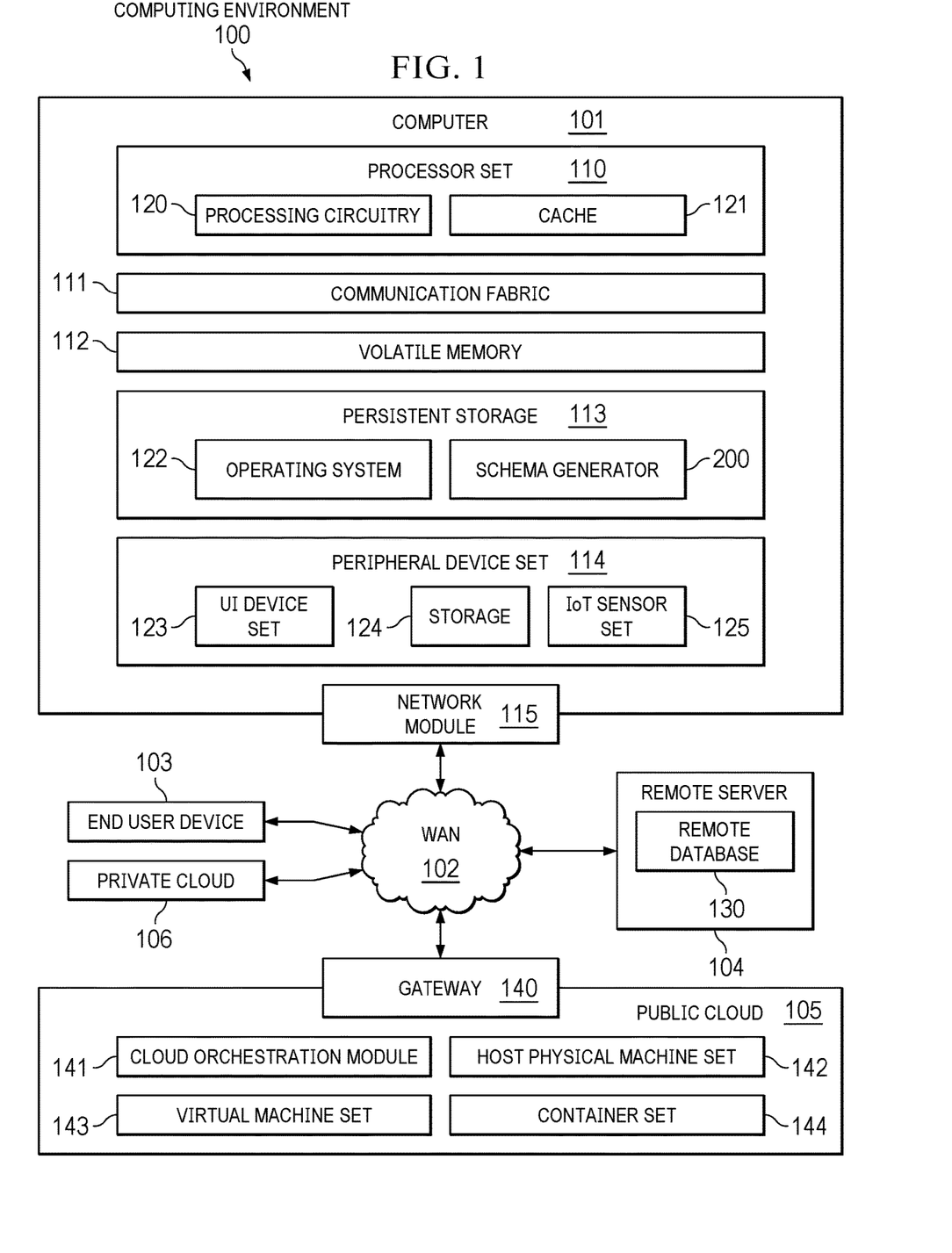
FIG. 1 depicts a pictorial representation of a computing environment in which illustrative embodiments may be implemented.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as schema generator 200. In addition to schema generator 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and schema generator 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in schema generator 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Schema generator instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that message mapping is commonly used in system integration products. At a minimum, message mapping requires a source schema and a set of mappings to produce an output message when presented with an input message. This output message may optionally be represented by a target schema, but this is not required as mapping technologies do not mandate target schemas when transforming messages.

The illustrative embodiments also recognize and take into account that while the absence of a target schema does not prevent runtime message transformation, it does make other activities more difficult. The lack of a schema prevents content-assist capabilities, for example, and validation of the output messages can be difficult or impossible.

The illustrative embodiments also recognize and take into account that prior approaches in schema translation have been aimed at translation between two or more known schemas with the main goal of constructing a mapping between the schemas. This approach is commonly referred to as relational schema mapping. Database schemas feature prominently in relational schema mapping because integrating legacy with newer data models requires this sort of approach. However, the starting point is two or more known schemas.

XML schema-to-schema mapping is another example of prior approaches that uses two known schemas as the starting point, as are attempts to build meta-mappings to enable reuse of existing schema mappings.

The illustrative embodiments provide a method for deriving a target schema starting from a source schema and a mapping.

A data schema refers to a format or shape of data that defines how data is organized and accessed by a user or application. Examples of schemas include hierarchical, network, relational, and XML. Each type of schema has a particular structure and rules for organizing and accessing the data.

Data mapping identifies data elements in a source system and maps them to corresponding data elements in a target system, which ensures that data is accurately and consistently transferred between systems. Data mapping can be used to integrate data from multiple sources into a single system or application.

The illustrative embodiments use two known pieces of information, a source schema and mapping, to generate a target schema by applying the mapping to the source schema itself without the need to process any messages. The method of the illustrative embodiments is applied at design time, in contrast to current methods that apply mappings to the runtime messages as they flow through the system. The approach of the illustrative embodiments allows integration-related schema and map scenarios to be handled successfully. The illustrative embodiments do not require messages to be run through the system and can also detect when an edge-case arises that cannot be mapped correctly, thereby reducing the chance of relying on an incorrect schema.

Figure 2:
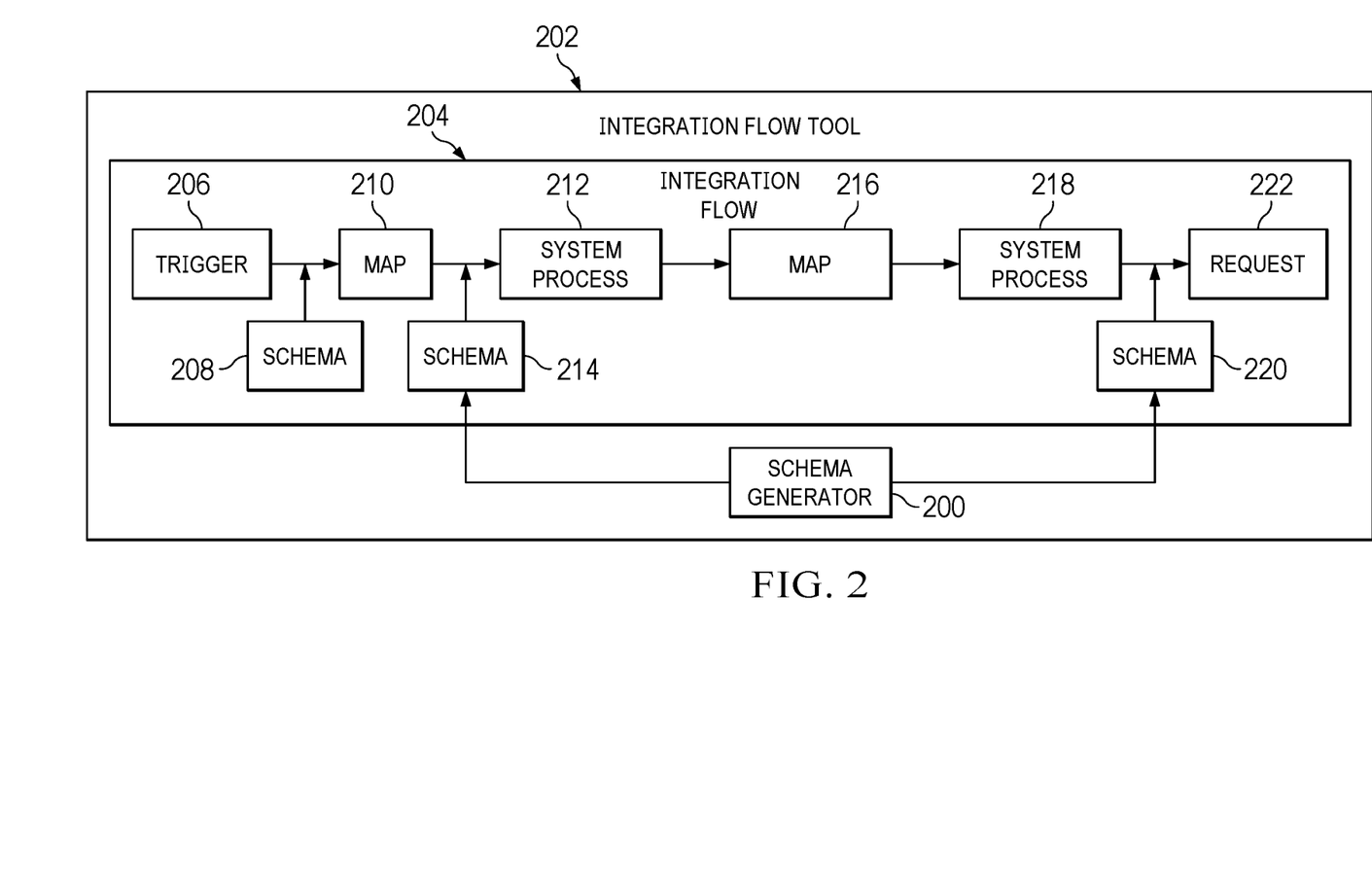
FIG. 2 depicts a block diagram for schema generation in accordance with an illustrative embodiment.

FIG. 2 depicts a block diagram for schema generation in accordance with an illustrative embodiment. Schema generator 200 can be implemented in computing environment 100 in FIG. 1.

Integration flow tool 202 is a UI-based tool for constructing integration flows. Integration flow 204 is an integration flow instance being created by the integration flow tool 202.

In response to an initial trigger 206 from an external system, a user provided schema 208 provides an input structure to a first map 210 containing query expressions. Schema generator 200 uses the known schema 208 and the first map 210 to generate a new schema 214, which is used to perform a system process 212, e.g., database read/write.

Schema 214 provides an input structure for a second map 216. Schema generator 200 then uses schema 214 and map 216 as inputs to generates another schema 220, which is used to perform system process 218 before generating a request 222 to an external system. FIG. 2 depicts a simple example of case of illustration. This process can be repeated as many times as needed. The generation of each new schema by schema generator 200 depends only on the previous map and schema.

The examples below depict the implementation of a schema generator using the JSONata query language. JSONata is a javascript library designed for querying and transforming JSON (JavaScript Object Notation) data. It has a location path syntax for navigation JSON structures similar in nature to the XPath syntax for XML data. Location path syntax is a notation used to specify the location of nodes within a document and can be used to navigate and select elements and attributes in the document.

The mechanism for transforming an input schema using a query language entails parsing both the schema and the query into hierarchical representations of their syntax and semantics. In the case of a query, the schema generator generates an abstract syntax tree (AST) when compiling the query. An AST is a data structure that represents the syntactic structure of source code written in a programming language. It comprises a tree-like structure that captures the hierarchical relationships between elements of the code (e.g., statements, expression, operators). Each node represents a syntactic element of the code, and the edges between the nodes represent the relationships between the elements.

In the case of the JSON schema, which is written using JSON syntax itself the AST is generated by parsing the JSON into a hierarchical data structure.

Figure 3:
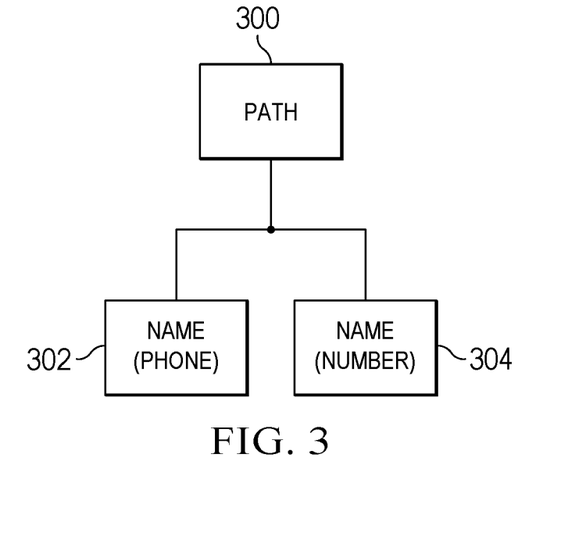
FIG. 3 depicts a query expression of a phone number converted to an abstract syntax tree in accordance with an illustrative embodiment.
Figure 4:
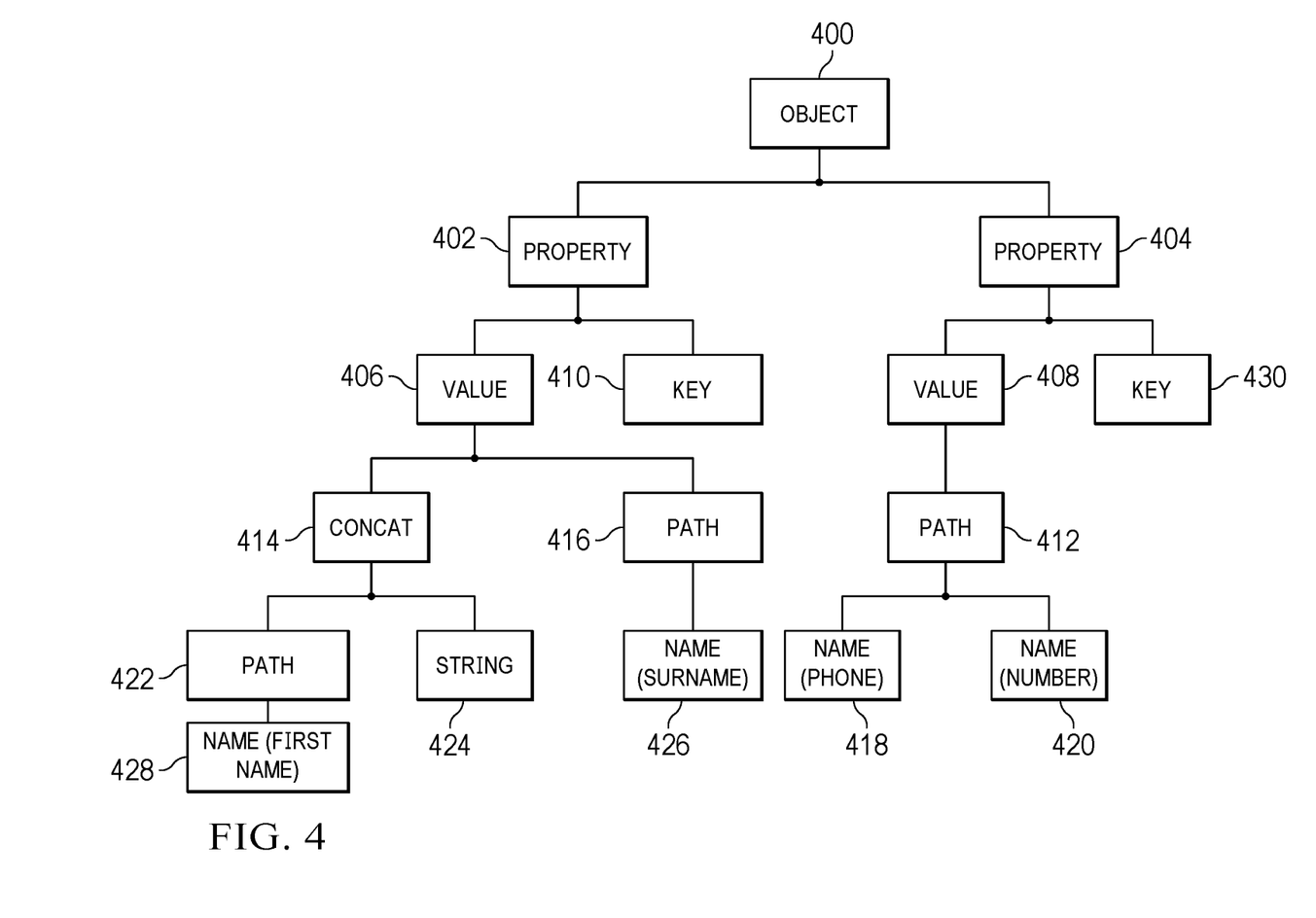
FIG. 4 depicts a query expression of a name converted to an abstract syntax tree in accordance with an illustrative embodiment.

With reference to FIGS. 3 and 4, exemplary tree diagrams for generating target schemas are depicted in accordance with illustrative embodiments. FIG. 3 and FIG. 4 are examples of abstract syntax trees generated for query expressions based on the input schema. In FIGS. 3 and 4, the input schema is a JSON schema with following the structure:

```
{
   "$schema": http://json-schema.org/draft-04/schema#,
   "type": "object",
   "properties":{
      "FirstName": {"type": "string"},
      "Surname":{"type": "string"},
      "Phone": {
         "type": "array",
         "items":[
            {
               "type": "object",
               "properties": {
                  "type": {"type": "string"},
                  "number": { "type": "string"}
               }
            }
         ]
      }
   }
}
```

In this example, abstract syntax trees are generated using query expressions based on the input schema, and the abstract syntax trees are traversed starting from the root node. The expression defines the structure and content of the output in terms of field references derived from the input schema. Different operations can be performed to generate target schema based on the types of nodes in the abstract syntax tree during traversal. For example, for a node with type "path," an operation is performed to traverse down the input schema to identify a 'properties' object for each step in the node with type "path." In this example, the traversal of the input schema identifies corresponding a property for each step in the node with type "path." If any property is identified to be "array," the following is written into target schema:

```
"type": "array",
"items": [
   "type": "<***>"
], where *** is type of final step property.
```

On the other hand, if none of the properties is identified to be "array," the following is written into target schema:
"type": "<*>", where * is type of final step property
In another example, for a node with type "object", the following is written into the target schema:
"type": "object" "properties": {*}, where * is the schema definition of each property defined in key-value pairs of the traversed abstract syntax tree.

In this example, key-value pairs of properties include key representing name of the property, and value representing schema type. The schema type is specified by the input schema for that data element, e.g., in the case of JSON, the schema type might be number, string, Boolean, array, or object.

In yet another example, for a node with type "concat" or any other function or operator that results in a string, the following is written into target schema:
"type": "string"

In yet another example, for a node with type that represents functions and operators that result in a number, the following is written into target schema:
"type": "number"

With reference to FIG. 3, a query expression of "Phone number" is converted to an abstract syntax tree as illustrated in FIG. 3. In FIG. 3, path 300 is the root node and has two child nodes. The two child nodes include Name (Phone) 302 and name (Number) 304. Name (Phone) 302 has a value of "Phone" and represents the first step in path 300, and Name (Number) 304 has a value of "number" and represents the second step in path 300.

In this example, traversal of the abstract syntax tree identifies path 300 as the root node. As depicted, a corresponding property for each step in the node with type "path" is identified from the input schema. In this illustrative example, path 300 includes Name(Phone) 302 with type "array" and Name(Number) 304 with a property of "string". In addition, Name (Number) 304 represents the last step in path 300. Consequently, the target schema is generated as following:

```
{
    "$schema": "http://json-schema.org/draft-04/schema#",
    "type": "array",
    "items": [ "type": "string"
    ]
}
```

With reference to FIG. 4, a query expression of

```
{
    "name": FirstName & " " & Surname,
    "mobile": Phone.number
}
``` is converted to an abstract syntax tree as illustrated in FIG. 4.

In FIG. 4, object 400 is the root node representing the entire object. Object 400 includes property 402 and property 404. Property 402 and property 404 represent key-value pairs within the object. Property 402 includes key 410. Key 410 is a node representing string of "name." Property 402 further includes value 406. Value 406 is a concat node and includes concat 414 on the left-hand side and path 416 on the right-hand side. The concat 414 is node that includes path 422 and string 424. Path 422 is a node that includes Name (First Name) 428 that represents a property of "FirstName". Path 422 also includes string 424 that is a node representing a single space, which in the present example is used to concatenate the first name ("FirstName") and a last name with a space in between. Path 416 is a node includes Name (Surname) 426 that represents the Surname property.

Property 404 includes key 430 and value 408. Key 430 is a node representing string "mobile." Value 408 is a node that includes path 412 as a child node. Path 412 has two child nodes. The two child nodes include Name (Phone) 418 and name (Number) 420. Name (Phone) 418 has a value of "Phone" and represents the first step in path 412, and Name (Number) 420 has a value of "number" and represents the second step in path 412.

In this example, traversal of the abstract syntax tree identifies object 400 as the root node. As depicted, for a node with type "object," the following is written into the target schema:
"type": "object" "properties": {*}, where * is the schema definition of each property defined in key-value pairs of the traversed abstract syntax tree.

In this example, a corresponding property for each step in the node with type "path" is identified from the input schema. In this illustrative example, path 422, path 416, and path 412 are identified as nodes with type "path." Path 412 includes Name(Phone) 418 with type "array" and Name (Number) 420 with a property of "string." Name(Number) 420 represents the last step in path 412. Consequently, the target schema is generated as follows:

```
{
    "$schema": "http://json-schema.org/draft-04/schema#",
    "type": "object",
    "properties": {
        "name": {
            "type": "string"
        },
        "mobile": {
            "type": "array",
            "items": [
                "type": "string"
            ]
        }
    }
}
```

Figure 5:
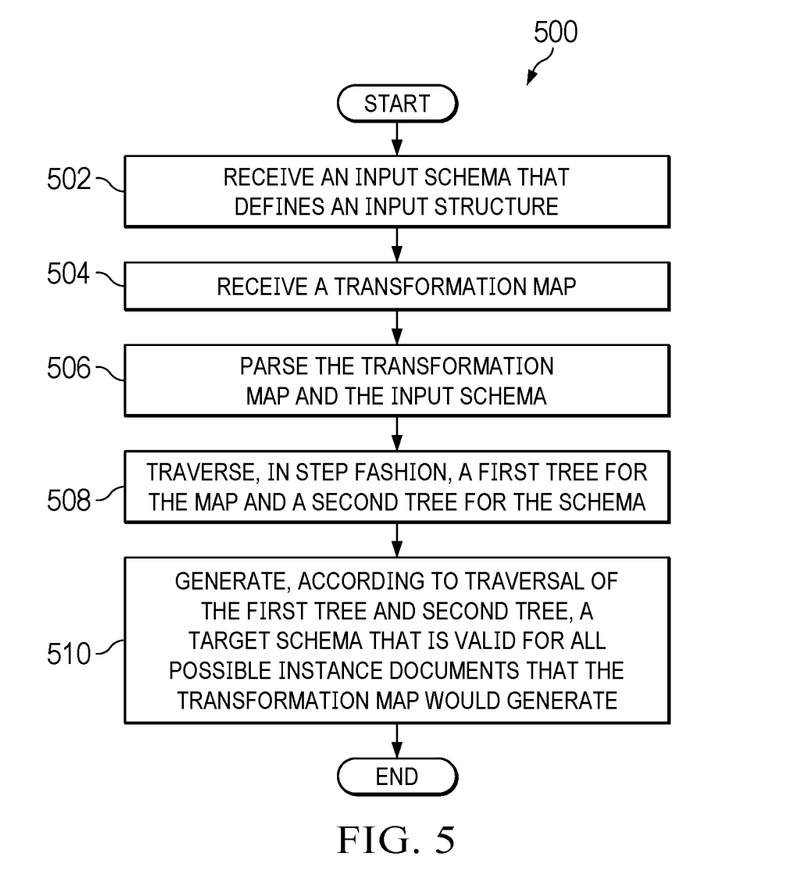
FIG. 5 depicts a flowchart of a process for generating a target schema in accordance with an illustrative embodiment.

FIG. 5 depicts a flowchart of a process for generating a target schema in accordance with an illustrative embodiment. Process in 500 can be in computing environment 100 in FIG. 1.

Process 500 begins by receiving an input schema that defines an input structure (step 502). The input schema comprises a parseable document that defines a valid set of instance documents. The input schema might comprise one of JavaScript Object Notation (JSON), standard generalized markup language (SGML), HyperText Markup Language (HTML), Extensible Markup Language (XML), Swift, Markdown, data format description language (DFDL), or other type of markup language.

The input schema might comprise a natural language definition of possible instance documents, wherein the target schema comprises a natural language description of outgoing instance documents.

A transformation map is also received (step 504). The transformation map might comprise executable code.

Process 500 then parses the transformation map and the input schema (step 506) and traverses, in step fashion, a first tree for the map and a second tree for the schema (step 508). The transformation map can be parsed into an abstract syntax tree (AST).

According to the traversal of the first tree and second tree, process 500 generates a target schema that is valid for all possible instance documents that the transformation map would generate (step 510). The target schema might be generated using JSONata query language. Process 500 then ends.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for generating a target schema for message mapping, the method comprising:
   using a number of processors to perform the steps of:
   receiving an input schema that defines an input structure;
   receiving a transformation map;
   parsing the transformation map and the input schema;
   traversing, in step fashion, a first tree for the transformation map and a second tree for the input schema; and
   generating, from the input schema and transformation map according to the traversal of the first tree and second tree, a target schema that is valid for all possible instance documents that the transformation map would generate, wherein the transformation map is applied to the input schema itself without need to process any messages.

2. The method of claim 1, wherein the transformation map is parsed into an abstract syntax tree.

3. The method of claim 1, wherein the transformation map comprises executable code.

4. The method of claim 1, wherein the input schema comprises a parseable document that defines a valid set of instance documents.

5. The method of claim 1, wherein the input schema comprises one of:
   JSON;
   standard generalized markup language;
   HTML;
   XML;
   Swift;
   Markdown; and
   data format description language.

6. The method of claim 1, wherein the input schema comprises a natural language definition of possible instance documents, and wherein the target schema comprises a natural language description of outgoing instance documents.

7. The method of claim 1, wherein generating target schema uses JSONata query language.

8. A system for generating a target schema for message mapping, the system comprising:
   a storage device that stores program instructions;
   one or more processors operably connected to the storage device and configured to execute the program instructions to cause the system to:
   receive an input schema that defines an input structure;
   receive a transformation map;
   parse the transformation map and the input schema;
   traverse, in step fashion, a first tree for the transformation map and a second tree for the input schema; and
   generate, from the input schema and transformation map according to the traversal of the first tree and second tree, a target schema that is valid for all possible instance documents that the transformation map would generate, wherein the transformation map is applied to the input schema itself without need to process any messages.

9. The system of claim 8, wherein the transformation map is parsed into an abstract syntax tree.

10. The system of claim 8, wherein the transformation map comprises executable code.

11. The system of claim 8, wherein the input schema comprises a parseable document that defines a valid set of instance documents.

12. The system of claim 8, wherein the input schema comprises one of:
    JSON;
    standard generalized markup language;
    HTML;
    XML;
    Swift;
    Markdown; and
    data format description language.

13. The system of claim 8, wherein the input schema comprises a natural language definition of possible instance documents, and wherein the target schema comprises a natural language description of outgoing instance documents.

14. The system of claim 8, wherein generating target schema uses JSONata query language.

15. A computer program product for generating a target schema for message mapping, the computer program product comprising:
   a computer-readable storage medium having program instructions embodied thereon to perform the steps of:
      receiving an input schema that defines an input structure;
      receiving a transformation map;
      parsing the transformation map and the input schema;
      traversing, in step fashion, a first tree for the transformation map and a second tree for the input schema; and
      generating, from the input schema and transformation map according to the traversal of the first tree and second tree, a target schema that is valid for all possible instance documents that the transformation map would generate, wherein the transformation map is applied to the input schema itself without need to process any messages.

16. The computer program product of claim 15, wherein the transformation map is parsed into an abstract syntax tree.

17. The computer program product of claim 15, wherein the transformation map comprises executable code.

18. The computer program product of claim 15, wherein the input schema comprises a parseable document that defines a valid set of instance documents.

19. The computer program product of claim 15, wherein the input schema comprises one of:
   JSON;
   standard generalized markup language;
   HTML;
   XML;
   Swift;
   Markdown; and
   data format description language.

20. The computer program product of claim 15, wherein the input schema comprises a natural language definition of possible instance documents, and wherein the target schema comprises a natural language description of outgoing instance documents.

* * * * *